United States Patent [19]
Roberts

[11] 3,771,318
[45] Nov. 13, 1973

[54] AUTOMOTIVE AIR CONDITIONING APPARATUS

[75] Inventor: Richard W. Roberts, Lombard, Ill.

[73] Assignee: Borg-Warner Corporation, Chicago, Ill.

[22] Filed: Nov. 26, 1971

[21] Appl. No.: 202,280

[52] U.S. Cl............. 62/227, 62/228, 62/244, 62/323
[51] Int. Cl............................................. F25b 1/00
[58] Field of Search.............. 62/227, 228, 243, 62/244, 323

[56] References Cited
UNITED STATES PATENTS
2,720,087  11/1955  Groeue ........................... 62/244
2,910,840  11/1959  Miller ............................. 62/244

Primary Examiner—Meyer Perlin
Attorney—William S. McCurry

[57] ABSTRACT

An air conditioning apparatus for an automobile including means for driving the compressor at a relatively constant speed, a control biasing this speed in accordance with the cooling load, and means for automatically disengaging the compressor drive when cooling is unnecessary.

18 Claims, 3 Drawing Figures

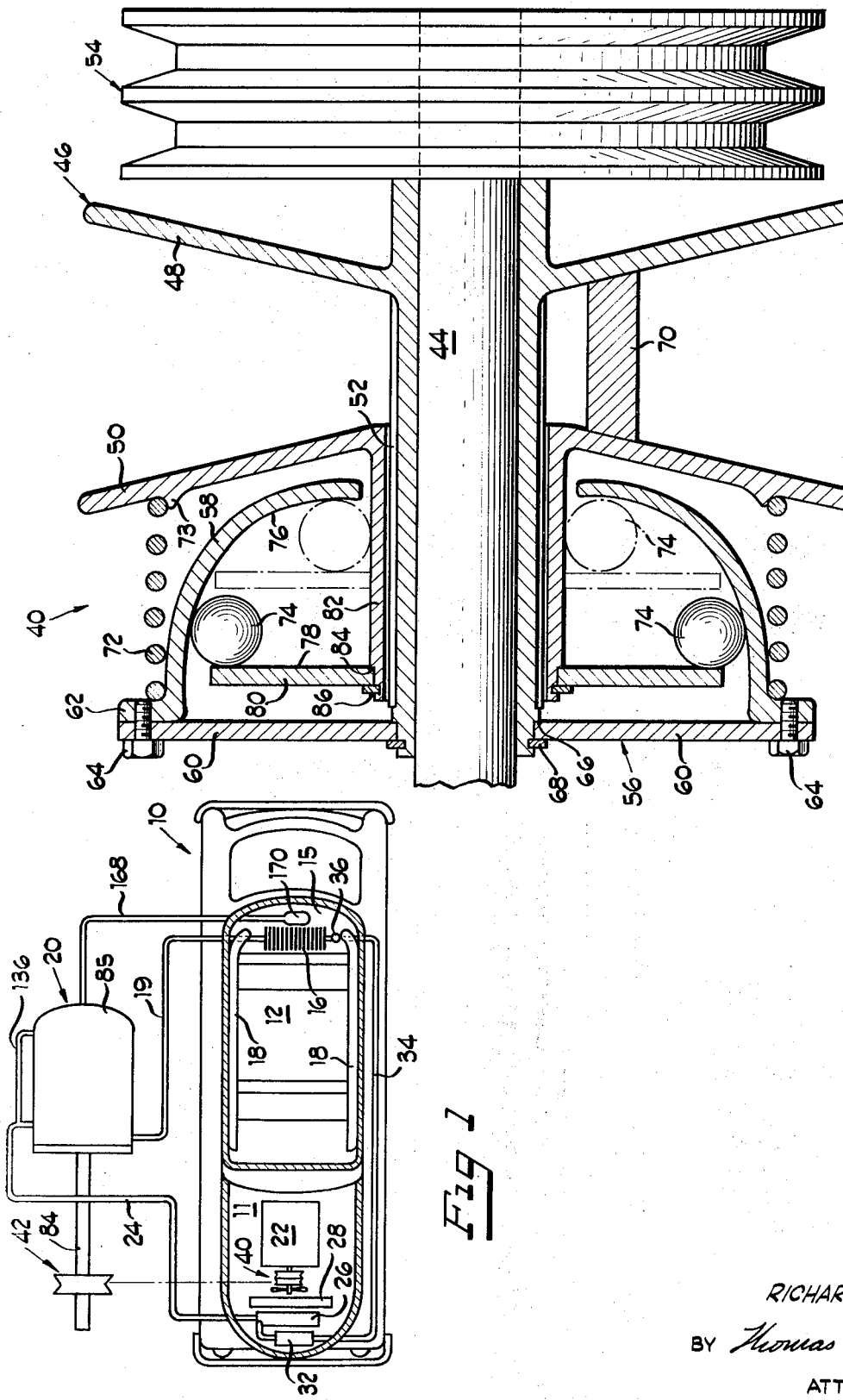

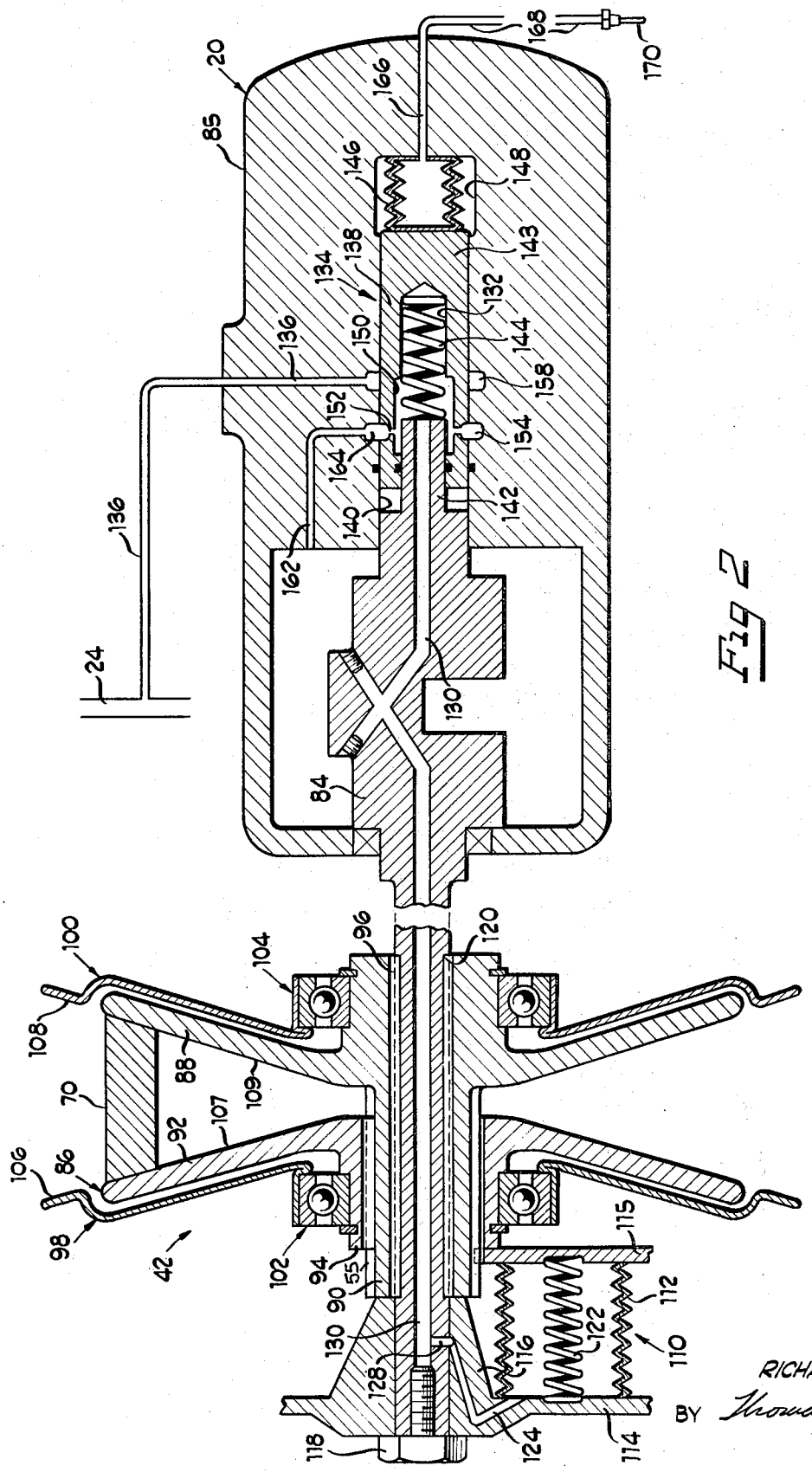

AUTOMOTIVE AIR CONDITIONING APPARATUS

BACKGROUND AND SUMMARY OF THE INVENTION

This invention relates to automotive air conditioning apparatus and more particularly to a control arrangement for the compressor drive of the apparatus.

It is currently standard practice to employ a magnetically-actuated type clutch to engage and disengage the drive between the engine and the compressor in automotive air conditioning systems, and the clutch is controlled by a thermostat sensing the temperature of the evaporator coil, or the air off the evaporator, in an attempt to match the compressor output to the cooling load. Normally, the compressor suffers from insufficient capacity at low engine speeds, requiring a high idle setting of the engine; and excess capacity at high engine speeds, requiring the clutch to be frequently disengaged and re-engaged against a high inertia and gas load on the compressor. As this service is severe, it is necessary to require a high quality clutch which is very nearly as heavy and almost as expensive as the compressor. In addition, this frequent clutch operation to stop and start the compressor causes wear of the compressor and may result in premature failure. Also, the excessive noise occurring in the compressor going into operation is annoying to the driver and occupants of the automobile.

The present invention provides an improved automotive air conditioning apparatus comprising a compressor drive system designed to overdrive the compressor at low engine speeds and underdrive the compressor at high engine speeds by two variable speed driven pulleys effective to provide nominally a superior match between the compressor and the load responsive to and actuated by centrifugal force. The driven pulley is pressure-biased in accordance with thermostat-sensing of the temperature of the evaporator coil, and it should normally be possible to match the compressor to the load without disengaging the compressor from the engine. However, under conditions of high engine speed and low cooling load, excess compressor capacity will require occasional release of the driven pulley.

Accordingly, a principal object of the invention is to provide an improved control arrangement for a compressor drive of an automotive air conditioning apparatus.

Another object of the present invention is to provide an improved compressor drive control arrangement for an automotive air conditioning apparatus and including variable speed driving and driven pulleys operative in response to engine speed and evaporator temperature to provide a constant speed drive for the compressor.

Additional objects and advantages will be apparent from the following detailed description taken in conjunction with the drawing.

DESCRIPTION OF THE DRAWING

FIG. 1 is a schematic plan view, with parts broken away, of an automobile equipped with an air conditioning apparatus embodying the present invention;

FIG. 2 is an enlarged, fragmentary view, in vertical section, of the improved air conditioning apparatus; and FIG. 3 is an enlarged sectional view of the drive pulley on the engine crankshaft.

DETAILED DESCRIPTION

Referring now to the drawing, in FIG. 1, reference numeral 10 generally designates a conventional passenger automobile having an engine compartment 11, a passenger compartment 12, and a luggage compartment 15.

For purposes of illustrating the present invention, the evaporator 16, mounted in the luggage compartment 15, is employed for providing cooling air which is distributed into the passenger compartment 12 through ducts 18 extending along the sides of the passenger compartment. The vaporized refrigerant is withdrawn from the evaporator through conduit 19 by a compressor 20 driven by the automobile engine 22 through the improved drive control arrangement of the present invention. The compressed refrigerant flows from the compressor through conduit 24 connected to a condenser 26 mounted directly in front of the engine radiator 28 to be cooled by the incoming air. The refrigerant condensed in the condenser 26 is supplied to a receiver 32 from which liquid refrigerant is supplied to the evaporator 16 through the conduit 34 having a thermostatic expansion valve 36 which controls the flow of refrigerant to the evaporator.

The improved compressor drive control arrangement for the described air conditioning apparatus comprises cooperating variable speed belt and pulley drive and driven units generally indicated at 40 and 42. The drive unit 40 is drivingly connected to the engine drive shaft 44 and includes a belt pulley 46 having a conical section 48, keyed to the shaft 44, and a mating section 50 slidably mounted on the hub of section 48 by means of engaging splines 52 connecting the sections for conjoint rotation and sliding movement of section 50 towards and from section 48. An auxiliary power take-off pulley 54 is keyed to the engine shaft 44 and which may rotate therewith to operate a water pump, etc.

The drive unit 40 is provided with a centrifugal force responsive mechanism which is dependent on the speed of rotation of the engine shaft 44. The unit comprises a housing 56 formed by a cup-shaped member or carrier 58 and an annular support plate 60, the plate 60 having its outer edge secured to the radially extending rim 62 of the member 58 by bolts 64. The housing 56 is secured to the engine shaft 44 for rotation thereby and is prevented from axial movement on shaft 44 by having plate 60 attached to the shaft with its inner edge between and engaging a shoulder 66 on the shaft 44 and a lock washer 68 located in a groove in the shaft. A V-belt 70 is located between and is adapted to be gripped by pulley sections 48 and 50. A coil spring 72 surrounds the cup-shaped member 58 of housing 56 and has one end seated against the rim 62 of the member 58 and its other end bearing against an annular stop 74 on the section 50. The spring is operative to constantly urge the section 50 toward the section 48 and in opposition to the action of the centrifugal force responsive mechanism which, as shown, comprises a series of ball-weights 74 positioned within the housing 56 and engaging the inner curved cam surface 76 of the cup-shaped member 58 and the flat surface 78 of an annular plate 80. The cone section 50 has its sleeve hub 82 extending through the cup-shaped member 58 and plate 80, the plate being fixed to the hub 82 by having its inner peripheral edge engaged with a shoulder 84 on the end of the hub 82 and with a lock washer 86 in a groove in the hub 82. It will be apparent that, when the engine shaft 44 is rotated at above a given speed, the ball-weights will move radially outwardly by centrifugal force from their innermost locations and along the cam surface 76 to the positions shown in FIG. 2 thereby causing movement of the plate 80 and cone section 50 axially of the shaft 44, against the action of the spring 72, in a direction separating the cone sections 48 and 50 of the pulley 46.

The variable speed V-belt and pulley driven unit 42 is mounted on the compressor crankshaft 84 which is rotatably supported in the casing 85. The unit 42 comprises a pulley 86 including a conical section 88 having its sleeve hub 90 fixed to the crankshaft, and a mating section 92 having a hub 94 splined at 95 to the hub 90 to connect the sections 88 and 92 for conjoint rotation and for slidable movement of section 92 relative to section 88, the sections engaging the V-belt 70. Belt retainer means are provided in the form of conical disks 98 and 100 mounted on bearing assemblies 102 and 104 respectively carried on the hubs 94 and 90 for supporting the disks adjacent to and for rotation relative to the conical sections 88 and 92. The disks 98 and 100 extend radially outwardly of the sections 88 and 92 and have their rims respectively overlapping the outer peripheries of the sections, a surface 106 of disk 98 is an extension of the conical belt-engaging surface 107 of the section 92 and surface 108 of disk 100 is an extension of conical surface 109 of the section 88 so that the belt can move radially outward of the pulley 86 to a position between the surfaces 106 and 108 of the disks 98 and 100 causing the belt to be free of the pulley 86 thus preventing driving of the compressor by the pulley, and being in confined retention but readily movable to engage the pulley when required.

A pressure-responsive servomotor 110 is provided to actuate the movable conical section 92 toward the fixed conical section 88 to move the belt in a radially outward direction. More particularly, the servomotor is mounted on the crankshaft and comprises an annular metal expansion bellows 112 closed at opposite ends by plates 114 and 115, the plate 114 having a sleeve hub 116 positioned on the crankshaft and fixed thereto by a bolt 118 threaded into the crankshaft and forcing the hub 116 into engagement with one end of the hub 90 of the conical section 88, the other end of the hub 90 engaging a stop shoulder 120 on the crankshaft. The plate 115 is splined to the hub 90 of conical section 88 and engages the hub 94 of conical section 92 and is movable, by refrigerant pressure admitted to the bellows, to actuate the section 92 toward the section 88 to force the belt radially outward of the pulley 86. Coil springs 122 are disposed within the bellows and engage the plates 114 and 115 to urge the plate 115 and thereby pulley section 92 toward the section 88 to maintain the sections in engagement with the belt.

The servomotor 110 is supplied with refrigerant at either suction pressure or discharge pressure depending on the position of the shuttle 138. The passage 152 through the shuttle will transmit suction pressure when adjacent to annulus 164, or discharge pressure when adjacent to annulus 158, through passages 130, 128 and 124 to the space enclosed by the bellows 112.

When the valve 138 moves to the right and connects the high pressure passage 136 to the servomotor as described above, the bellows 112 expands and drives the conical section 92 of the pulley 86 toward the conical section 88 of the pulley for effecting movement of the belt 70 radially outward of the pulley, and also to a position in which the belt is disconnected from the pulley and engages the disks 98 and 100 to freewheel on the bearing assemblies 102 and 104 and thereby completely disengage the compressor from the engine. The valve 134 comprises a movable element in the form of a hollow plug 138, closed at one end, and disposed in and engaging the surface of a cylindrical bore 140 in the compressor casing 85. The crankshaft is rotatable within the bore 140 and has a reduced end portion 142 extending within the plug 138 and on which the plug is movable axially of the bore 140. The plug is moved in one direction by a spring 144 within the plug and which engages the end wall 143 of the plug and also the crankshaft end portion 142 to position the plug as shown in FIG. 2, with its end wall engaging a metal expansion bellows 146 in a chamber 148 of the compressor casing located contiguous to and communicating with the bore 140 of the casing. The plug 138 is provided with a cylindrical groove 150 in its inner surface, a radial passage 152 connecting the groove 150 to an annular groove 154 in the outer surface of the plug. The portion of conduit 136 in casing 85 terminates in an annular groove 158 in the bore 140 of the casing. The casing also has an exhaust passage 162 and an annular groove 164 connecting the grooves 154 and 150 and chamber 132 of valve member 138 for flow of refrigerant to the crankcase of the compressor. The interior of the bellows 146 is connected by a passage 166 to a conduit 168.

A thermostat is provided for controlling operation of the bellows 146 in response to the demand of the evaporator and includes a bulb 170 (FIG. 1) disposed adjacent to the evaporator fins and connected to the conduit 168. The bellows 146, conduits 166 and 168, and bulb 170 are charged with a volatile liquid causing contraction and expansion of the bellows in response to the evaporator fin temperature.

When the temperature of the evaporator fins is above 32° F., the volatile liquid expands to cause the bellows to expand, against the action of the spring 144, to position the valve plug 138 as shown in FIG. 2 and, as a result, refrigerant under pressure in the bellows 112, passages 124, 128, 130 and in the chamber 132 of the valve plug 138, is exhausted through groove 150, passage 152 and groove 154 of the plug to the groove 164 and passage 162 to the compressor crankcase to disable the servomotor 110. When the evaporator fin temperature is at or below 32° F., the volatile liquid contracts to cause the bellows 146 to contract and the spring 144 acts to move the valve plug 138 to a position in which the annular groove 154 in the plug is aligned with the groove 158 in the casing thereby causing refrigerant under high pressure from the compressor to flow from conduit 24 to conduit 136 and into grooves 158 and 154, passage 152 and groove 150 to chamber 132 of the plug and through passage 130 to actuate the servomotor 110 and thereby the pulley section 92 to move the belt retainer radially outward of the pulley 86 and between the freewheeling retainer disks 106 and 108 to disconnect the compressor from the engine.

OPERATION

Upon energization of the automotive engine and at low engine speeds, the centrifugal force responsive mechanism of the drive unit 40 is inoperative to urge the conical sections 50 and 48 apart as the spring 72 holds the section in close proximity so that the driven unit 42 is rotated at high speed overdriving the compressor.

When the engine speed increases and the centrifugal force responsive mechanism moves the balls 74 along the cam surface 76 of the cup-shaped member 58, the spring 72 is gradually compressed and the conical sections 48 and 50 of the pulley 46 will be spread apart. This action allows the belt to be moved to a smaller radius on the driving pulley 46 and to a larger radius on the driven pulley 86 and thereby the compressor is driven at less than engine speed, as shown in FIG. 2, the engine operating at high speed.

When the evaporator fin temperature is at a predetermined minimum, 32° F., for example, the volatile liquid in the thermostat bulb 170 contracts and causes the bellows 146 to contract to cause the spring 144 to move the valve plug 138 to position the groove 154 in the plug in registry with the groove 158 in the casing 85 so that refrigerant under high pressure flows from the conduits 24 and 136 to and through the valve and passage 130 to the servomotor 110 to move the conical section 92 of pulley 86 toward the conical section 88 to force the belt radially outward between and into engagement with the surfaces 106 and 108 of the disks 98 and 100 to disengage drive of the compressor from the engine. Upon the evaporator fin temperature rising above 32° F., the volatile liquid expands and causes the bellows to expand to move the valve plug to a position exhausting the refrigerant from the servomotor 110 to re-engage the belt with the pulley sections 88 and 92 and re-establish drive of the compressor by the engine. These actions always occur at minimum compressor speed and provide smooth engagement and disengagement of the compressor drive from the engine.

It will be apparent that my improved compressor drive control arrangement provides for driving of the compressor at a relatively constant speed, with this speed being controlled in accordance with the cooling load, and providing automatic disengagement of the drive when cooling is not required.

What is claimed is:

1. In an automotive refrigeration system including a compressor, a condenser, and an evaporator connected to provide a refrigeration circuit, a drive train through which drive is transmitted from the automotive engine to the compressor, said drive train including a power shaft operatively connected to the engine and a driven shaft operatively connected to said compressor, first and second expansible and contractible pulleys on the power shaft and driven shaft respectively, a V-belt entrained on said pulleys, means for expanding one of said pulleys and contracting the other of said pulleys including actuating means operative in response to refrigerant pressure, means for controlling refrigerant pressure to said actuating means, and means operative in response to evaporator tempeature for operating said controlling means.

2. In an automotive refrigeration system as defined in claim 1 in which said actuating means is operative in response to refrigerant pressure as measured at said condenser.

3. In an automotive refrigeration system as defined in claim 1 in which said actuating means is operative in response to refrigerant pressure as measured at said condenser to contract said other pulley, and said means for expanding said one pulley includes means responsive to the speed of the power shaft.

4. In an automotive refrigeration system as defined in claim 1 in which said actuating means is a servomotor.

5. In an automotive refrigeration system as defined in claim 4 in which said refrigerant pressure-controlling means is a valve operable to provide refrigerant pressure to said servomotor and to exhaust refrigerant pressure from said servomotor.

6. In an automotive refrigeration system as defined in claim 5 in which said evaporator temperature-responsive means includes a thermostat adjacent said evaporator and an expansible and contractible bellows engaging said valve, said thermostat and bellows including a volatile fluid operative to expand said bellows to move said valve to provide refrigerant pressure to said servomotor and to contract said bellows to move said valve to exhaust refrigerant pressure from said servomotor.

7. In an automotive refrigeration system as defined in claim 4 in which said servomotor is operative to contract said other pulley, and said actuating means also includes spring means operative to expand said other pulley to engage said belt when said servomotor is inoperative.

8. In an automotive refrigeration system as defined in claim 4 in which said servomotor comprises a bellows operative to contract said other pulley, and said refrigerant-controlling means is a valve operable to provide refrigerant pressure to said bellows and to exhaust refrigerant pressure from said bellows.

9. In an automotive refrigeration system as defined in claim 4 in which said servomotor is operative to contract said other pulley to move said V-belt radially outward of said other pulley to disengage said V-belt from said other pulley.

10. In an automotive refrigeration system as defined in claim 1 in which said actuating means is a servomotor operative in response to evaporator temperature.

11. In an automotive refrigeration system as defined in claim 1 in which said means for expanding said one pulley include means responsive to the speed of the power shaft, and said actuating means is operative to contract said other pulley.

12. In an automotive refrigeration system as defined in claim 11 in which said actuating means includes a servomotor operative in response to high side refrigerant pressure.

13. In an automotive refrigeration system as defined in claim 11 in which said one pulley includes a conical section fixed to said power shaft and a conical section movable axially of said power shaft, and said speed responsive means includes a carrier fixed to said power shaft, a pressure plate connected to said movable conical section, and centrifugal weights disposed between the carrier and said plate and adapted to become operative to move said plate to actuate said movable conical section away from said fixed conical section automatically when the power shaft is rotating at above a predetermined speed.

14. In an automotive refrigeration system as defined in claim 13 in which spring means are positioned between and engage said plate and said movable conical section to urge said movable conical section towards said first conical section.

15. In an automotive refrigeration system as defined in claim 13 in which said carrier is provided with a cam surface, and said weights are balls engaging said cam surface.

16. In an automotive refrigeration system as defined in claim 1, in which said actuating means comprises a servomotor including a first contractible and expansible bellows operative to contract said other pulley, and said refrigerant pressure-controlling means is a valve operative to provide refrigerant pressure to said first bellows and to exhaust refrigerant pressure from said first bellows, and in which said evaporator temperature-responsive means includes a thermostat contiguous to said evaporator, and an expansible and contractible second bellows engaging said valve, said thermostat and second bellows including a volatile fluid operative to expand said second bellows to move said valve to provide a refrigerant pressure to said servomotor and to contract said second bellows to move said valve to exhaust refrigerant pressure from said servomotor, and in which said means for expanding said one pulley includes a means responsive to the speed of the power shaft.

17. In an automotive refrigeration system as defined in claim 16 in which said one pulley includes a first conical section fixed to said power shaft and a second conical section movable axially of said power shaft, and said speed-responsive means includes a carrier fixed to said power shaft, a pressure plate connected to said movable conical section, and centrifugal weights disposed between the carrier and said plate and adapted to become operative to move said plate to actuate said second conical section away from said first conical section automatically when the power shaft is rotating at about a predetermined speed.

18. In an automotive refrigeration system as defined in claim 17 including belt-retainer elements respectively supported at opposite sides of said other pulley for rotation relative to said other pulley and having portions extending radially outwardly of said other pulley and adapted to releasably engage said belt upon movement of said belt to and from a position outwardly of said other pulley.

* * * * *